March 1, 1955  R. E. SELTZER  2,703,193
SLIDE PLATE SUPPORT FOR AGRICULTURAL MATERIAL DISTRIBUTORS
Filed Sept. 14, 1949  3 Sheets-Sheet 1
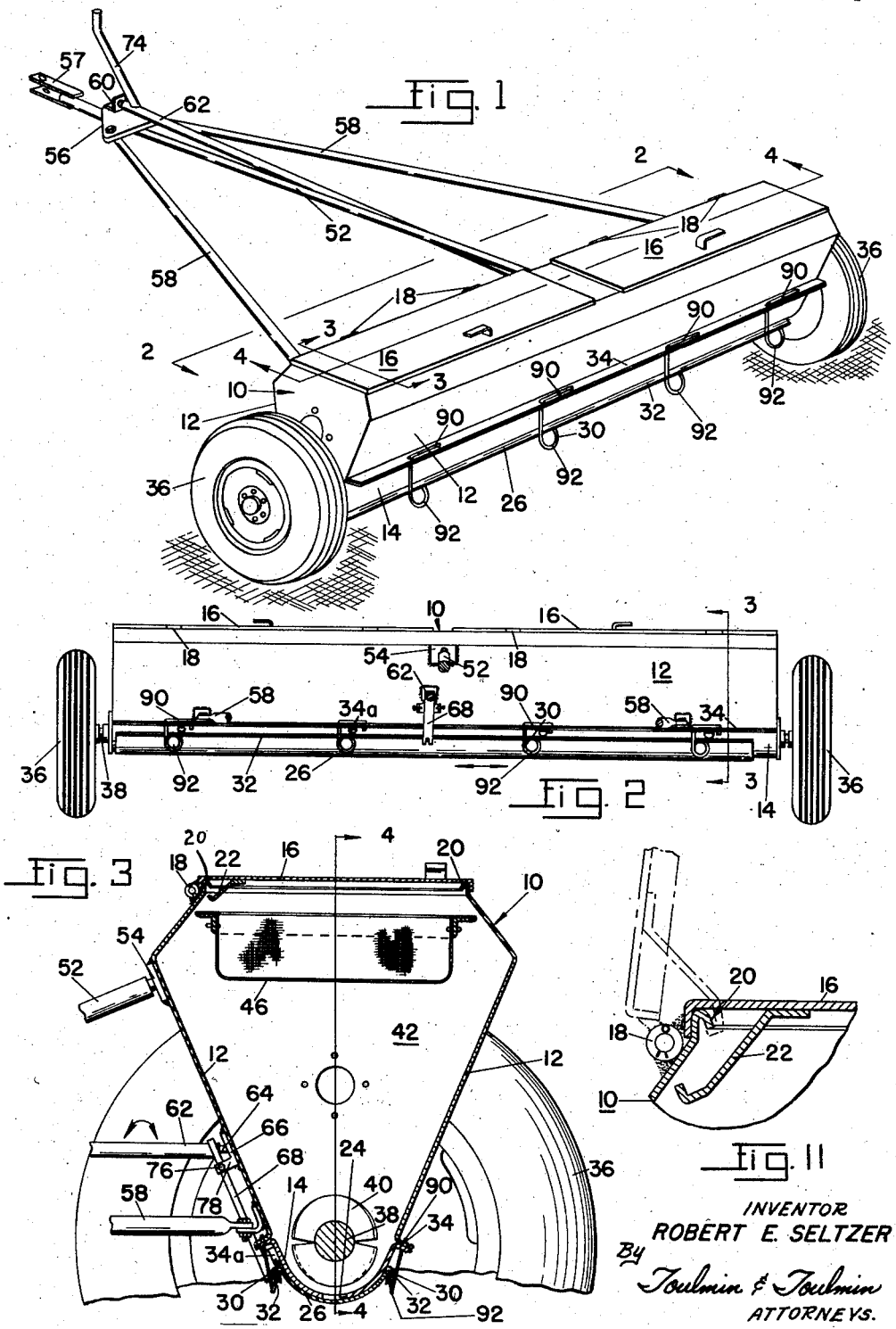
INVENTOR
ROBERT E. SELTZER
BY
Toulmin & Toulmin
ATTORNEYS.

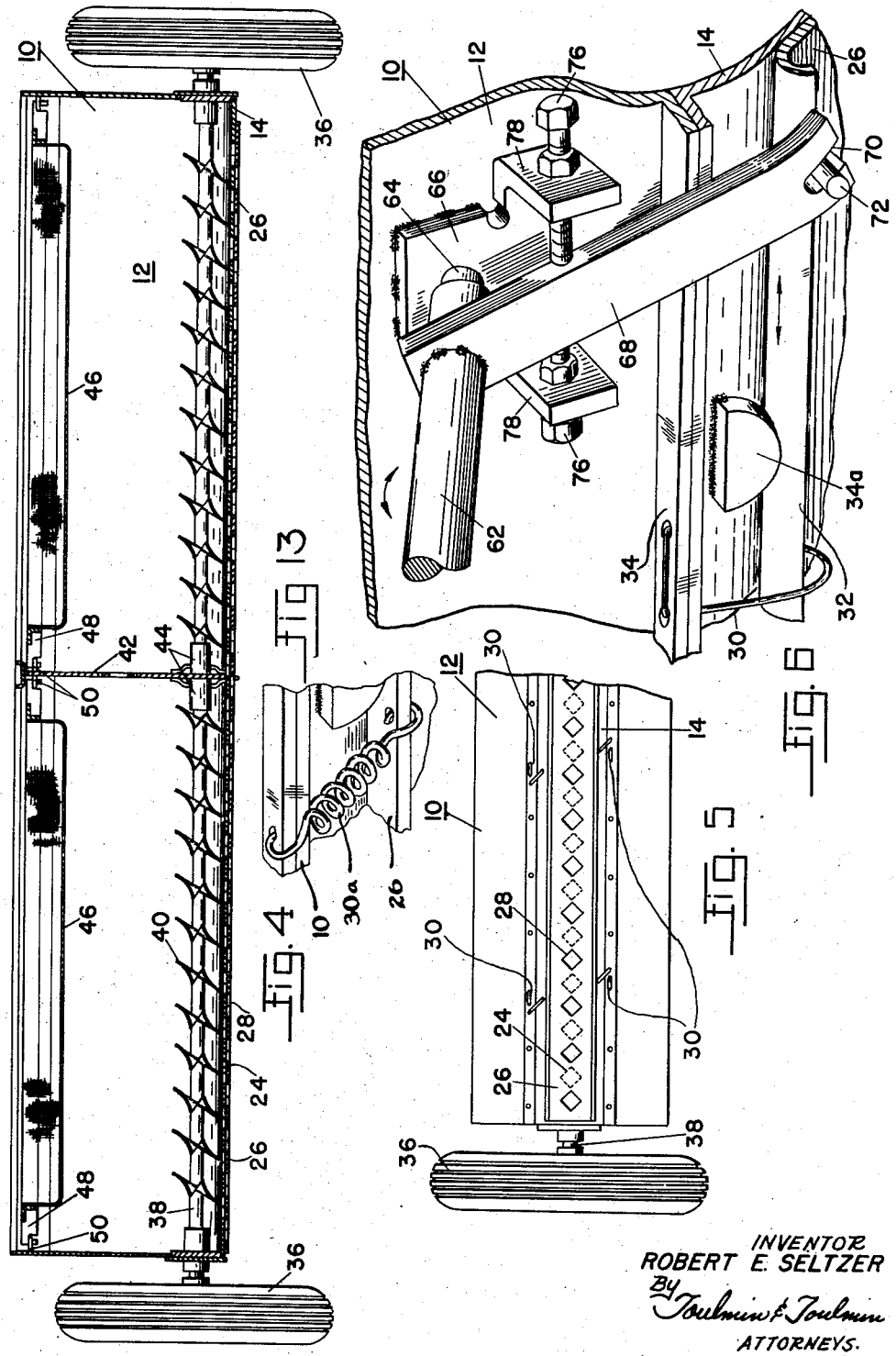

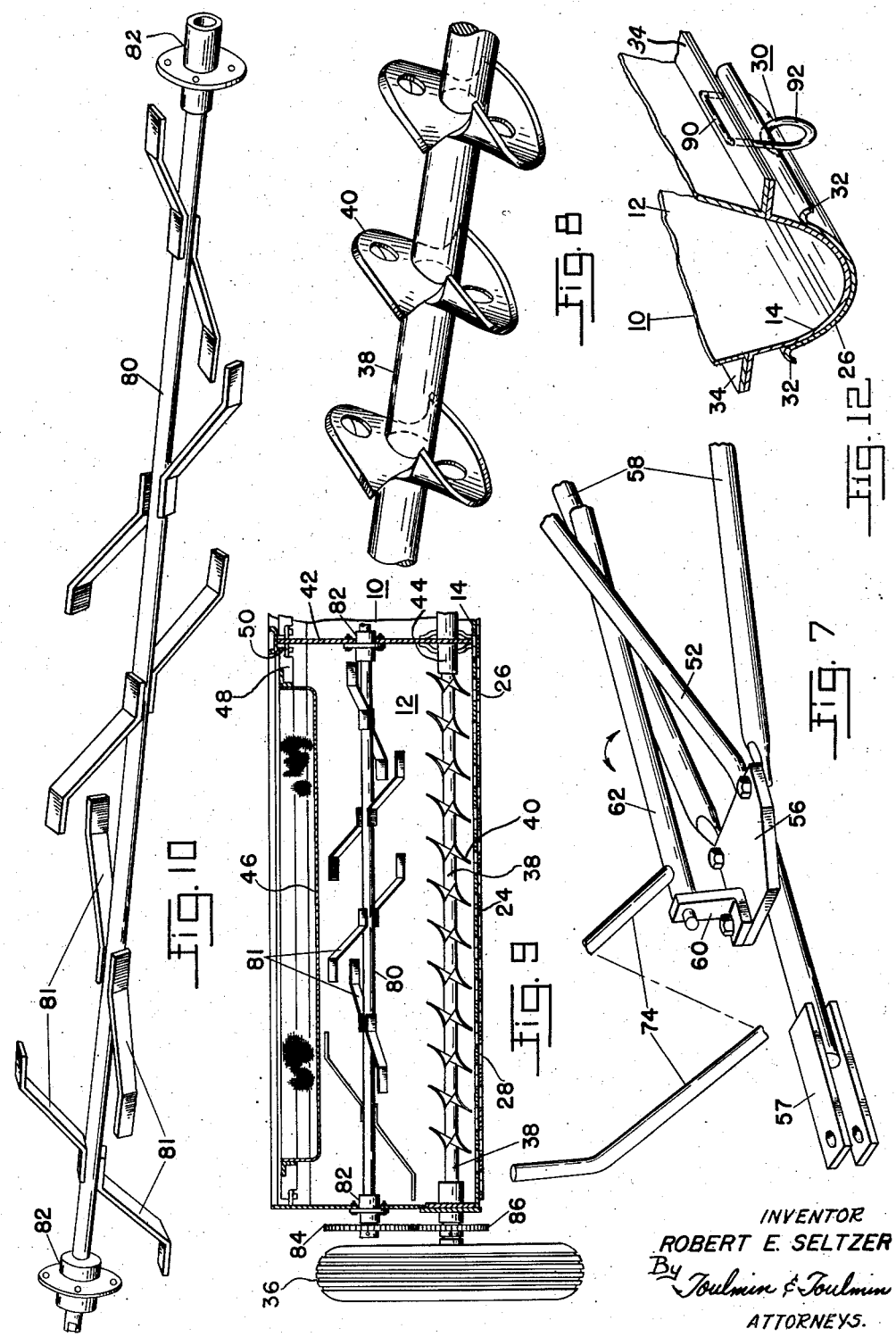

2,703,193
Patented Mar. 1, 1955

UNITED STATES PATENT OFFICE 2,703,193

SLIDE PLATE SUPPORT FOR AGRICULTURAL MATERIAL DISTRIBUTORS

Robert E. Seltzer, Bellevue, Ohio, assignor, by mesne assignments, to Spred-All, Inc., Bellevue, Ohio, a corporation of Ohio Application September 14, 1949, Serial No. 115,595

3 Claims. (Cl. 222—512)

This invention relates to lime and fertilizer spreaders and the like, especially devices of this nature made of such a size as to be useful in connection with agricultural work.

Lime and fertilizer spreaders in general are well known in the art and usually comprise a rather elongated hopper which receives the material to be discharged and a series of adjustable ports on the bottom of the hopper through which the material is discharged. Actuator means are usually mounted within the hopper for maintaining the lime or fertilizer broken up and for making sure that it is presented to and passes through the aforementioned openings.

Inasmuch as the lime and fertilizer has a tendency to form clods and to bridge up within the hopper, it has always been a problem to maintain the clods broken up within the hopper and to make sure that the material was evenly discharged to each and every one of the outlet ports in the bottom of the hopper. Many different actuator and distributing arrangements have been tried, but none thereof have been particularly successful.

This invention, accordingly, includes the provision of an improved agitator means for use in connection with lime and fertilizer spreaders and the like, and which is operable to make certain that there is always a continuous and uniform discharge of the material being spread from the device.

As mentioned above, spreaders of this nature generally include adjustable ports in the bottom of the hopper, and it is customary to adjust the size of these ports by means of a sliding cover plate having ports adapted for variable registration with the ports in the bottom of the hopper. These sliding cover plates have always been a source of trouble because they rattle or are supported in such a manner that they sometimes fall off, or are difficult to adjust, or difficulty is experienced in removing them for cleaning the space at the bottom of the hopper of accumulation of dirt, lime, and fertilizer.

Accordingly, a further purpose of this invention is to provide a greatly improved sliding plate arrangement which eliminates the difficulties referred to above.

Most slidable plates of the type referred to above can be adjusted only at the spreader, and one of the particular objects of this invention is to provide an arrangement by means of which the said plate can be adjusted remotely from the spreader, as, for example, from the seat of the tractor which is drawing the spreader.

Further objects of this invention include the provision of constructional features in connection with the spreader such that it is relatively inexpensive to construct and can, therefore, be sold at a reasonable price, and the provision of other improved features of merit in connection with the servicing and repair of the device.

These and other objects and advantages will become more apparent upon reference to the following description taken in connection with the accompanying drawings in which:

Figure 1 is a perspective view of a spreader unit constructed according to my invention;

Figure 2 is a view looking in at the spreader as indicated by the line 2—2 on Figure 1;

Figure 3 is a vertical section through the spreader as indicated by line 3—3 on Figure 2;

Figure 4 is a vertical longitudinal section as indicated by line 4—4 on Figures 1 and 3;

Figure 5 is a view looking up from beneath the spreader and showing the arrangement of the slide plate thereon which adjusts the area of the discharge ports;

Figure 6 is a perspective view showing the adjustment and location of the slide plate;

Figure 7 is a perspective view showing the end of the hitch frame for the spreader which is adapted for connection to a tractor;

Figure 8 is a perspective view showing a portion of the main actuator which is located in the bottom of the hopper of the machine;

Figure 9 is a vertical section similar to Figure 4, but showing the appearance of the spreader when an auxiliary actuator is employed therewith;

Figure 10 is a perspective view showing the auxiliary actuator;

Figure 11 is a fragmentary view showing in detail the connection with the hinged lid of the spreader;

Figure 12 is a fragmentary perspective view showing the spring retaining clip for the slide plate on the bottom of the hopper; and Figure 13 is a fragmentary view showing a modified form of spring for holding the slide plate on the hopper.

Referring to the drawings somewhat more in detail, the spreader shown therein comprises in general a hopper 10 having inclined side walls 12 which terminate at the bottom in a rounded nose part 14.

The upper part of the hopper 10 is open and is adapted for being closed by a lid 16, hinged as at 18. The periphery of the opening at the top of the hopper is rolled in, as will be seen at 20 in Figures 3 and 11, and does not only add strength to the hopper, but gives a blunt upper edge about the opening in the hopper that prevents injury to anyone working in connection with it.

The turned down edge 20 is utilized as a stop for supporting the lid 16 when open by means of the clips 22 secured to the inside of the lid as shown in Figure 11. This figure also shows the lid in the open position (dot-dash outline).

As will be seen in Figures 3, 4, and 5, the rounded nose part 14 of the bottom of the hopper is provided with a plurality of diamond-shaped apertures 24, which are for the purpose of permitting the lime or fertilizer being spread to fall to the ground. A cover plate 26 is provided that fits over the said rounded nose part and which is also provided with a plurality of diamond-shaped aperture 28. It will be evident that shifting of the plate 26 axially will be effective for varying the useful area of each port 24 by bringing one of the ports 28 of the said plate more or less into registration with the corresponding port 24.

Plate 26 is adapted for being supported in position on the bottom of the hopper by a plurality of spring elements 30 hooked at their lower ends to the outwardly extending lips 32 along the edges of plate 26, and engaging at their upper ends the outwardly extending flange parts 34 of the hopper which form the junctions between the side walls 12 and the nose part 14.

In order properly to locate plate 26 circumferentially of the nose part of the hopper, there may be provided the parts 34a secured to the said nose part and being rounded on one side so as to bear against the adjacent lip 32 of the plate 26.

As will be seen in Figures 1, 2, and 4, the spreader comprises a pair of ground wheels 36 which are mounted on and connected with an axle 38 that traverses the hopper 10 along a line substantially co-axial with the center of curvature of the nose part 14.

Mounted on the shaft is a plurality of curved actuator members 40 which may be seen in perspective in Figure 8. Each of these actuator members comprises a pair of oppositely twisted parts, as shown, and are mounted on their supporting shaft at an angle so that as the shaft is rotated, the said actuator members move the material being dispensed by the spreader first in one direction, and then in the other direction across the ports 24. In this manner it is insured that the discharge of material will be uniform from all of the ports, and, at the same time, there is no tendency for the said material to be continuously moved toward one end of the hopper or the other. Rather, it is continuously shifted back and forth across the apertures 24 without any accumulated axial movement in either direction.

For the purpose of stiffening the hopper and, also, to provide an intermediate support for shaft 38, there may be a central partition 42 in the hopper 10 which supports the journal means 44 for receiving shaft 38.

In many cases in connection with lime, fertilizer, and similar materials, it is desirable to screen the material before it goes into the hopper in order to make certain that no particles of foreign matter above a predetermined size will get into the hopper. For this purpose, I provide the screen baskets 46 that hang by means of hooks 48 on clips 50 inside the end walls of the hopper 10 and on opposite sides of intermediate wall 42. These baskets, as will be seen, can readily be removed at any time.

Referring now to Figures 1, 2, 3, and 7, the elements of the hitch frame for the spreader will be seen. This hitch frame includes a central bar or tube 52 secured at its rear end to the upper front face of hopper 10, as by means of member 54. Tube 52 extends forwardly and downwardly and passes beneath the plate 56 and then is connected with a clevis or hitch yoke 57. From spaced points on plate 56 to the outer bottom corners of the hopper 10, there extends a pair of bars or tubes 58 which are preferably bolted at both their front and rear ends to plate 56 and hopper 10, so that they can be removed at any time. It will be apparent that this provides for a simple, light, but very strong hitch frame.

As will be seen in Figure 7, there is mounted on plate 56 an upstanding bracket 60 which rotatably receives the front end of a bar or tube 62 that is pivotally supported at its rear end on a pin 64 projecting outwardly from a bracket 66 welded onto the front of the hopper 10. An arm 68 extends downwardly from the rear end of the tube 62 and is slotted as at 70 to receive a pin 72 connected with slide plate 26.

At the forward end, tube 62 supports a lever 74 that extends upwardly to adjacent the driver's seat of a tractor connected with clevis 57 so the tractor driver can manipulate lever 74 at any time so as to turn tube 62 on its pivotal supports and thereby swing the lever 68 and adjust the position of slide plate 26.

Bracket 66 preferably includes stop means exemplified by adjustable screws 76 which are threaded through the upturned side members 78 integral with the said bracket 66. It is to be noted that stop screw 76 can be adjusted to obtain predetermined limits of movement of lever 68, or can be turned in so as positively to hold said lever at any desired position of adjustment.

As mentioned before, it is sometimes necessary to provide auxiliary actuator means to prevent the material being dispensed from clodding up within the hopper. According to my invention, this secondary actuator takes the form illustrated in Figures 9 and 10, wherein it will be seen to comprise a shaft 80 located above shaft 38 and supported on journal means 82 in the end and center walls of the hopper 10. The shaft 80 extends through one of the end journal means and mounts a gear 84 that meshes with a gear 86 on shaft 38 so that the primary and secondary actuators will rotate in unison.

The actuating means associated with shaft 80 comprise a plurality of bars 81 bent into a somewhat extended Z shape, as shown, and welded in pairs in the said shaft as illustrated.

One of the features of this invention to which attention should be directed, is that of supporting a slide plate 26 by means of tension springs. These springs not only support the plate in position on the nose 14 of the hopper, but also prevent it from rattling as the spreader moves, providing a ready means for removing the slide plate for cleaning at any time, and, due to their inherent resilience, permit easy adjustment of the plate when it is desired to vary the effective size of the discharge ports in the bottom of the hopper.

The shafts 80 and 38 have been referred to as extending the entire length of hopper 10, and it will be apparent that it may be preferable for each of the said shafts to be made in halves and each half to extend from one end wall of the hopper to the intermediate wall 42. In this case, a set of the gears 84 and 86 would appear at each end of the hopper. The advantage of so dividing the shafts 38 and 80 into halves would be that the ground wheels 36 could move independently of each other, and thereby permit more easy turning of the spreader in the field with an according reduction of tire wear and of strain on the said shafts.

Referring again to the spring elements 30, in Figure 13, it will be seen that these may take the form of tension springs 30a hooked between the slide plate and the hopper, while in Figures 1, 2, 3, and 12, these elements are clips consisting of a length of spring wire having one end bent over, as at 90 in Figure 12, to engage the flange 34 of the hopper, and with their other ends formed to a single helix as at 92. The slide plate has a rolled over lip thereon forming a gutter or groove to receive the helix of the spring clip and in this manner the slide plate is firmly, but resiliently, held against the bottom of the hopper, and in such a manner that it can be shifted axially of the hopper readily, or removed therefrom.

It will be understood that this invention is susceptible to modification in order to adapt it to different usages and conditions, and, accordingly, it is desired to comprehend such modifications within this invention as may fall within the scope of the appended claims.

I claim:

1. The combination in a spreader of the type described; of a hopper having discharge openings in the bottom, said bottom being arcuate in cross-section, an arcuate slide plate also having openings therein fitting over said bottom shiftable therealong for bringing the openings in the slide plate into variable registration with said discharge openings for varying the effective area of said discharge openings, said hopper and plate each having outwardly projecting flanges extending along the entire length of each side thereof, one of said flanges on each side forming a gutter concave on the side opposite the other said flange on the same side, and a plurality of spring clips distributed along each side of the hopper each having a relatively large helical end portion slidably engaging the concave side of the said gutter on the same side of the hopper, each clip having a straight portion extending tangentially from the helical end portion to the other of said flanges on the same side of the hopper and detachably connected thereto.

2. A spring clip especially adapted for supporting a slide plate on the bottom of a hopper of a distributor of the nature described; a length of spring wire having a straight center part and having one end shaped to the form of a relatively large diameter helix of at least one complete turn, said helix being adapted for engaging beneath a gutter along the edge of the slide plate, the other end of said clip bent out substantially at right angles to form a flat hook, said hook being adapted for engaging an apertured flange on the hopper, said center part of the clip being tangential to said helix, and said hook and helix being located on the same side of said center part.

3. The combination in a spreader of the nature described; of a hopper having discharge openings along the bottom thereof, said bottom being arcuate in cross-section and having outwardly projecting flanges at its opposite sides, an arcuate slide plate fitting over said bottom, said slide plate having openings therein for registration with the discharge openings in the hopper so as to be shiftable along the hopper for varying the effective area of said discharge openings, said slide plate having its opposite edges bent downwardly to form gutters along the margin of the slide plate that are concave downwardly and which are convex toward the said flanges on the hopper, a plurality of spring clips distributed along each side of said hopper and each spring clip comprising a length of spring wire having its upper end formed to a hook shape, apertures formed in the flanges on the hopper to receive the upper ends of the spring clips in supporting relation, each spring clip having its lower end formed to a large diameter helix of at least one complete turn and the outer periphery of the helix being engaged beneath the adjacent gutter on the slide plate thereby resiliently to hold the slide plate against the hopper bottom while permitting sliding movement of the slide plate along the bottom, and blocks secured to the side of the hopper bottom beneath one of the said flanges thereon and bearing on the adjacent edge of the slide plate thereby to locate the slide plate on the hopper bottom.

(References on following page)

References Cited in the file of this patent

UNITED STATES PATENTS

| | | |
|---|---|---|
| 177,082 | Strout | May 9, 1876 |
| 195,809 | Durbin | Oct. 2, 1877 |
| 509,856 | Allen | Dec. 5, 1893 |
| 550,842 | Peters | Dec. 3, 1895 |
| 1,173,503 | Goetzke | Feb. 29, 1916 |
| 1,300,234 | Adduci | Apr. 15, 1919 |
| 1,334,223 | Byrd | Mar. 16, 1920 |
| 1,650,808 | Van Brunt | Nov. 29, 1927 |
| 2,035,058 | Feltman | Mar. 24, 1936 |
| 2,350,107 | Gandrud | May 30, 1944 |
| 2,510,231 | Juzwiak | June 6, 1950 |
| 2,541,008 | Stahmer II et al. | Feb. 6, 1951 |